United States Patent
Schwinghammer et al.

[19]

[11] Patent Number: 5,953,661
[45] Date of Patent: Sep. 14, 1999

[54] METHOD OF MAXIMIZING SPECTRAL EFFICIENCY IN A CELLULAR COMMUNICATIONS SYSTEM

[75] Inventors: Pat Schwinghammer, Denver; Murry Westall, Parker; Randy Stevens, Denver; Leonard L. Westlake, Larkspur, all of Colo.

[73] Assignee: Nextel Communications, McLean, Va.

[21] Appl. No.: 08/857,684

[22] Filed: May 16, 1997

[51] Int. Cl.⁶ .................................................. H04B 1/00
[52] U.S. Cl. .............................. 455/423; 455/33; 455/34; 455/54; 455/62; 379/59; 379/60
[58] Field of Search .................................. 455/33, 34, 54, 455/56, 62, 67, 524, 456, 457; 379/59, 60, 63; 375/329, 340

[56] References Cited

U.S. PATENT DOCUMENTS

| | | |
|---|---|---|
| 5,038,399 | 8/1991 | Bruckert . |
| 5,594,943 | 1/1997 | Balachandran .......................... 455/33.2 |
| 5,732,354 | 3/1998 | MacDonald .............................. 455/456 |

FOREIGN PATENT DOCUMENTS

| | | |
|---|---|---|
| 0740485 | 10/1996 | European Pat. Off. . |
| 9637082 | 11/1996 | WIPO . |

*Primary Examiner*—Wellington Chin
*Assistant Examiner*—Pablo Tran
*Attorney, Agent, or Firm*—Jones, Day, Reavis & Pogue

[57] ABSTRACT

A system and method for operating a cellular communication system is disclosed wherein frequency reuse of available carrier frequencies is maximized, thereby maximizing system traffic capacity. The invention includes an outer cell grid generated by a plurality of base station transceivers connected to a common network controller. Within the grid of outer cells is at least one overlapping sub-grid of inner cells that may be generated by the same base stations as the outer cells, or which may be generated using separate base station transceivers located within the outer cell. At least two frequency reuse patterns are applied to the cells, one pattern for the outer cells and another, tighter pattern for the inner cells. The inner cells are defined and limited by a predetermined threshold co-channel interference level (C/I), the interference emanating from adjacent inner cells operating at the same frequencies. The invention also includes mobile units that can directly measure both RSSI and C/I of the serving cell and associated neighbor cells. The mobile units take periodic measurement reports which are transmitted to the network when a predetermined threshold interference condition has been met. The network controller than switches the mobile unit to one of the neighbor cells. The present method and system can be used with other traditional techniques for optimizing frequency reuse, such as underlay/overlay or microcellular methods.

18 Claims, 4 Drawing Sheets

METHOD OF MAXIMIZING SPECTRAL EFFICIENCY IN A CELLULAR COMMUNICATIONS SYSTEM

BACKGROUND OF THE INVENTION

The present invention is directed toward the field of cellular communications systems and methods of operating the same. In particular, a method for maximizing the spectral efficiency of the available carrier frequencies in a cellular system is disclosed. As used in this application, the term spectral efficiency refers to the traffic capacity of a particular system based on available carrier frequencies. Put another way, for a given number of carrier frequencies, a system that can carry more traffic has greater spectral efficiency. The method of the present invention maximizes system traffic capacity (and hence the spectral efficiency) by assigning multiple overlapping frequency reuse patterns to a cellular grid consisting of a plurality of adjoining outer cells, and at least one sub-group of inner cells or sub-cells contained within the outer cells. The inner cells of the present invention are interference-limited as opposed to path-loss or signal-strength limited and may be generated using the same equipment as the outer cells. This method can be applied to any cellular system that employs mobile units capable of directly measuring the interference level of the serving cell and adjacent or neighboring cells in order to provide a fast mobile-assisted handoff (MAHO) as the mobile unit moves from the outer cell grid to the inner cells and vice versa.

In any cellular system the spectral efficiency of available carrier frequencies is important since spectral efficiency correlates to traffic capacity. Generally, cellular network providers are assigned a limited number of carrier frequencies over which they can operate their systems. So, it becomes critical for the network provider to maximize the efficiency in which these assigned carrier frequencies are used. The more often a particular carrier frequency can be reused in the system, i.e. the more often the system can use the same carrier frequency for multiple communications with mobile units being serviced by the system, the more efficient the system is and the more traffic it can carry. Therefore, it is desirable in any cellular system to be able to maximize the reuse of the available carrier frequencies. Prior art systems have not provided an effective technique for maximizing carrier reuse.

Most cellular systems generate a grid of adjacent cells (outer cells), each outer cell being generated by a separate base station transceiver. A cell is the geographic area over which a particular base station can effectively communicate with mobile units in the system. The base station transceiver includes an antenna, transmitting and receiving circuitry, and circuitry for connecting the base station to at least one network controller that manages the overall operation of the cellular system. One example of such a cellular system is the iDEN network, built by Motorola, Inc. (See, Technical Overview Notes on the iDEN System, Motorola Document, PRO-PCP-026, Version R01.00.02, May, 1995, for an overview of this digital cellular system.)

iDEN, like many other cellular systems, provides base station transceivers for generating a grid of outer cells. Mobile units (subscribers) initiate calls within the system by communicating to a nearby base station that sets up the call. The base station that a mobile unit is presently communicating with is known as the serving base station. If the mobile unit is travelling about the cellular system, such as a subscriber in a car, it becomes necessary to detect when the communication signal from the mobile unit is degrading and switch the mobile unit to another outer cell. Mobile units in the iDEN system measure the received signal strength (RSSI), or power, from the serving cell and from adjacent neighboring outer cells, and also directly measure the carrier to interference ratio (C/I) of the serving cell and adjacent neighboring cells. The C/I measurement, or interference measure, is made in iDEN using Motorola's patented (U.S. Pat. No. 5,490,177) Symbol Quality Estimate (SQE), which is a fast, direct measure of interference in a QAM modulated digital system. The mobile units periodically take these measurements, and if handoff criteria programmed into the system are met, a report is transmitted to the network controller to trigger a handoff to another cell. Although the iDEN system provides mobile assisted direct measurement of signal strength and interference, the system does not provide an effective technique for maximizing frequency reuse of available carrier frequencies in order to maximize traffic capacity of the system.

In the iDEN system, as in other prior art cellular systems, a grid of outer cells is provided. Because of interference levels between adjacent outer cells, a given carrier frequency cannot be used in immediately adjacent cells. In fact, specific carrier frequencies must be spaced apart by many cells in order to be effectively reused in these systems with an acceptable interference level. For example, the iDEN system typically employs a frequency reuse pattern with a cluster size of 17 cells. The cluster size measurement is also known as the "K-value". With a cluster size of 17, a particular carrier frequency can be reused only every 17 cells. This is a substantial problem in urban areas where the number of mobile units is high, and the number of available carriers may not be sufficient to support the user traffic when each carrier can only be reused every 17 to 20 cells in the cellular grid and the cells are typically spaced miles apart. When channels are unavailable calls are blocked, i.e. not allowed into the system, or may be dropped, i.e. a connected call is disconnected. Either case is an undesirable scenario for the cellular system provider. So, a method of maximizing carrier frequency spectral efficiency of such cellular systems is needed.

Prior art attempts to maximize the spectral efficiency of available carrier frequencies generally include schemes that require additional hardware (or base stations) in order to operate the method. Two examples of such systems are the "underlay/overlay" method and the "microcell" method. In the underlay/overlay method, a path-loss limited inner cell is positioned within each outer cell of the cellular grid. This is accomplished by placing an additional base station transceiver at the exact location as the transceiver that is generating the outer cell. But, the second base station transceiver is placed at a lower altitude than the outer cell base station in order to increase path-loss, and hence increase C/I. The problem with this type of system is that because the inner-cell is limited by path-loss or RSSI, and because the mobile units in such systems directly measure only the RSSI parameter, it is possible that the system will switch the mobile unit to a cell where the RSSI might be acceptable but the interference level (C/I) from an adjacent cell using the same carrier frequency is not acceptable. In order to compensate for this possibility, radio planners designing such an underlay/overlay system must set the handoff path-loss threshold such that the mobile will not switch to a cell with unacceptable C/I. This requires the radio planner to introduce a high degree of fading margin into the design of the inner cell, thus yielding an inefficient use of available carrier frequencies, and hence a less-than-maximum traffic capacity for the cellular network.

Another type of prior art underlay/overlay type of system also employs path-loss limited inner cells, and then attempts to calculate or estimate the C/I based upon the mobile unit's measurement and reporting of RSSI. Although such a system can yield improved performance over the traditional underlay/overlay system, fading margins must still be implemented, and if the mobile unit is moving at a fast rate of speed, then the extra time required to perform the complex C/I calculation may be too great for the network controller to be able to make the switching decision in a timely fashion.

Still another type of prior art system for improving frequency reuse is a microcellular system in which inner cells are added to the outer cells, but not at the same location as the outer cell. These systems require the addition of hardware to the cellular network to support the inner microcells, and also suffer from the same problems as the underlay/overlay systems in terms of being limited to measuring RSSI in order to make a handoff decision, and the associated efficiency limitations of such RSSI-only systems.

A common shortcoming with the traditional underlay/overlay and microcellular approaches is the use of path-loss limited sub-cells. The switching boundary of these sub-cells is set by the RSSI level at which the system has been programmed to handoff. These types of systems do not permit the use of overlapping frequency reuse schemes having tight reuse patterns because they have no means for directly measuring the interference from neighboring sub-cells. The RSSI-only measurement will not assume that a cell has adequate noise immunity from nearby sub-cells, only that there is sufficient signal strength. Therefore these systems may perform a handoff to a cell that has an unacceptable level of interference, which translates into poor call quality.

Therefore, there remains a need in this art for a method and system for maximizing spectral efficiency of a cellular network. More particularly, there remains a need for such a system that can be implemented in existing outer cell-only cellular systems, such as iDEN, without having to add additional hardware to the system. However, such a method could be combined with traditional methods for increasing the carrier frequency reuse efficiency in a cellular system, such as underlay/overlay or microcellular approaches.

There remains a more particular need for a cellular system employing overlapping multiple frequency reuse patterns with outer cells and at least one level of inner cells, wherein carrier frequencies are reused more efficiently on the inner cells than in the outer cells.

There remains an additional need for such a system in which the inner cells are not limited or bounded by path-loss or RSSI, but rather are limited by the actual interference generated by adjacent inner cells, and in which the mobile units of the system are able to directly measure the interference of the serving cell and nearby neighboring cells in order to perform a mobile-assisted handoff (MAHO) with the network controller.

SUMMARY OF THE INVENTION

The present invention overcomes the problems noted above and satisfies the needs in this field for a method of maximizing the spectral efficiency in a cellular system. The method of the present invention is for use with a cellular communications system having a grid of outer cells generated by a plurality of base station transceivers in communication with at least one network controller that manages system traffic. The method includes the steps of assigning, or programming, into the system a first frequency reuse pattern to the grid of outer cells at a particular K-value, generating at least one sub-grid of inner cells within the outer grid, wherein the inner cells are defined and limited by a predetermined threshold interference level from adjacent inner cells operating at the same carrier frequencies as those assigned to the inner cells, assigning or programming into the system a second frequency reuse pattern to the sub-grid of inner cells at a particular K-value that is less than the K-value of the outer cells, and providing a plurality of mobile units for use in the system that have the ability to directly measure the interference level of a serving cell (the cell or base station that the mobile is presently communicating with), and at least one neighbor cell, which the mobile could possibly switch over to if the measured interference in the serving cell becomes too high, or some other condition is met.

According to the present method, the mobile units connect to a particular base station or serving cell when a call is generated and download a neighbor list from the serving cell. The neighbor list is a listing of adjacent outer and inner cells that are nearby the serving cell and to which a mobile unit could be switched by the network if certain conditions are met. After the mobile unit downloads the neighbor list, it periodically performs direct measurements of path-loss or signal strength (RSSI), and C/I or interference, from the serving cell and from the neighbors on the list. When the measured interference parameter of the serving cell increases above a particular threshold level programmed into the system, the mobile unit transmits a measurement report to the serving base station and onto the network controller indicating an unstable or undesirable situation. The network controller then determines which neighbor to switch the mobile over to based upon the RSSI and C/I measurement data.

According to the present method, additional sub-grids of inner cells can be added with correspondingly tighter frequency reuse patterns. In theory, there is no limit to the number of sub-grids of inner cells that can be generated, or overlapped, on the main grid of outer cells, although in reality this overlapping of sub-grids will be limited by the number of available carriers, and by the overhead to the system caused by the increased handoff requests in such a system. In the preferred embodiment of the invention described below, there are three levels of cells, an outer cell, an inner-cell, and an inner—inner cell. The outer cells have a conservative frequency reuse cluster size, or K-value, that approximates the traditional K-value used in cellular systems having only an outer grid of cells. The inner cell has a lower K-value, corresponding to a tighter frequency reuse pattern, and the inner—inner cells have an even lower K-value, and could in fact, have a K of 1, indicating that in each inner—inner cell the same frequencies are reused. This is the optimum frequency reuse condition in any cellular system.

Although the preferred embodiment of the invention is described in terms of an existing cellular system with multiple overlapping cells co-located at particular base station transceivers, this is only one embodiment, but is preferred since it requires the addition of no hardware to the existing cellular system. Alternatively, the method of the present invention can be used in combination with other types of frequency reuse efficiency schemes, such as underlay/overlay, microcell, etc. The combination of the present invention and these schemes will yield even greater spectral efficiency gains than with the schemes alone.

In addition, the present invention provides a system for maximizing spectral efficiency in a cellular system including: (i) a plurality of base stations in communication with a network controller, wherein the base stations generate an outer cell grid having frequencies assigned to the outer grid based on a first, conservative, frequency reuse pattern; (ii) at least one sub-grid of inner cells that are defined and limited by a particular interference threshold level programmed into the system, the sub-grid having frequencies assigned based upon a second tighter frequency reuse pattern; and (iii) a plurality of mobile units able to directly measure the interference level in a serving cell and adjacent cells in order to provide MAHO with the network controller.

As will be appreciated, the invention is capable of other and different embodiments, and its several details are capable of modifications in various respect, all without departing from the spirit of the invention. Accordingly, the drawings and description of the preferred embodiment are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE PREFERRED EMBODIMENT

Figure 1:
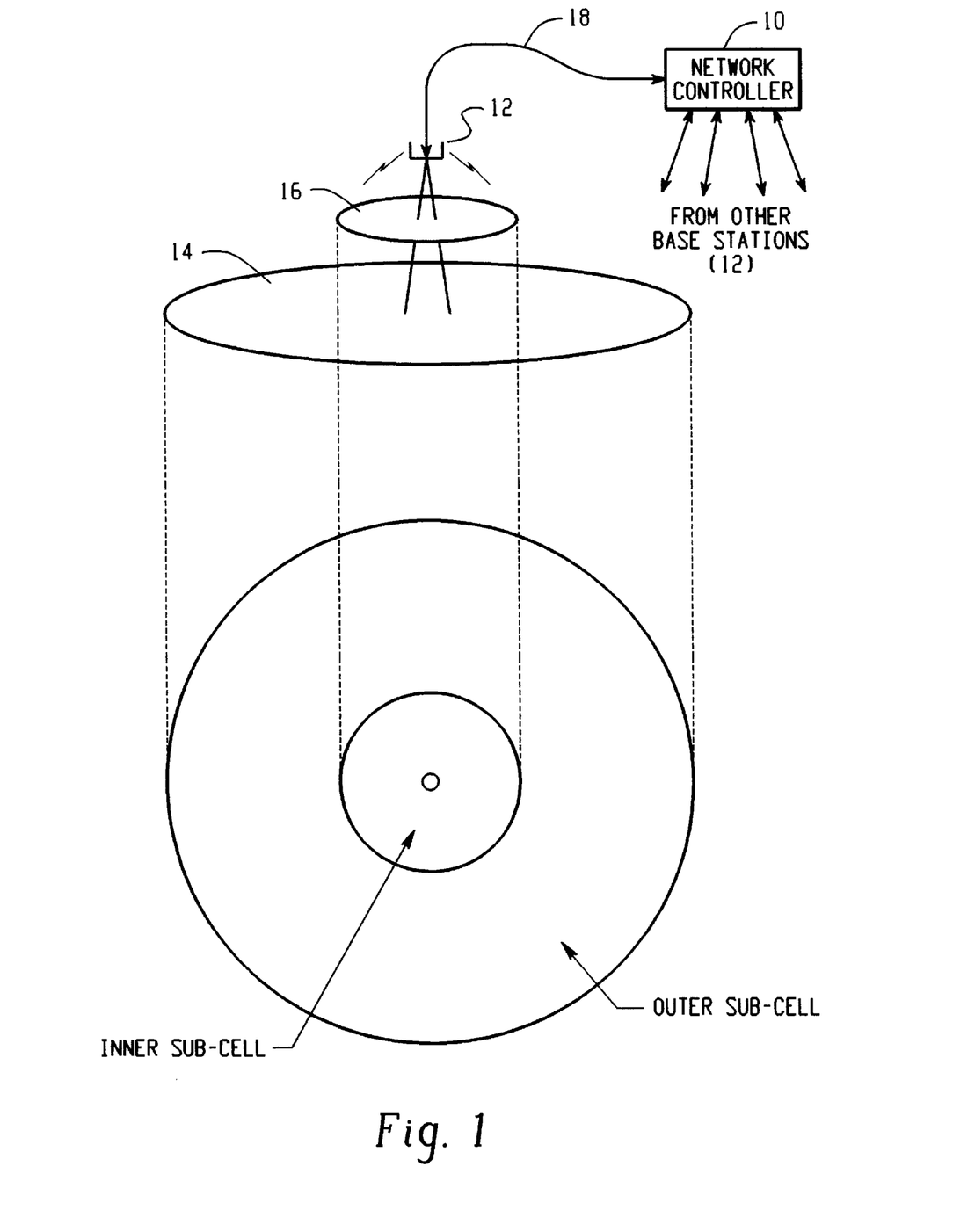
FIG. 1 is diagram of a single base station according to the present invention generating an outer cell having a first frequency reuse pattern and at least one inner cell having a second frequency reuse pattern.

Referring now to the drawings, FIG. 1 sets forth a diagram of a single base station 12 that forms part of the system and method of the present invention. The base station 12 includes transmission and reception equipment (not shown) for communicating with mobile units that are nearby the base station, and also includes at least one antenna, which could be either an omnidirectional antenna or a sectorized antenna. Connecting base station 12 to the network controller 10 is a communication link 18. Although FIG. 1 shows a single network controller 10, alternatively there could be numerous, distributed controllers for managing the network traffic.

The network controller 10 is a computer system programmed to manage traffic on the cellular network. Programmed into the network controller 10 are instructions for managing the frequency resources available to the cellular system. The network controller 10 is programmed with the frequency reuse plan(s) for the system, assigns certain communication channels to the various base stations 12, receives measurement reports from mobile units traversing the cellular grid, and includes handoff algorithms for determining when to handoff a mobile unit to another cell based upon the measurement reports (a process known as mobile assisted handoff (MAHO)).

In order to program the network controller 10 with the appropriate frequency reuse plans to be implemented by the plurality of base stations 12, several preliminary planning steps are required. Although the steps involved in modeling a particular cellular network and determining the frequency plan are within the knowledge of one of ordinary skill in the art, an example plan is set forth herein for completeness. The first step in developing a frequency plan for a cellular system is to determine the number of RF channels or carriers that are required for each cell site. This is accomplished by: (i) predicting the number of subscribers during busy hours within each cell's footprint; (ii) predicting the type of calls, length of call, and the acceptable blocking rate; (iii) predicting the number of talk channels needed to carry the predicted traffic rate at the designed blocking rate; and (iv) by translating the required number of talk channels into a required number of RF carriers based on the number of talk channels per carrier (e.g., the iDEN system has 6 talk channels per carrier frequency).

Once the number of RF carriers per cell has been established, a propagation modeling tool, such as Planet, ANET, etc., is used to maximize the desired cell site footprint while minimizing RF energy far away from the cell site. These propagation modeling tools take into account antenna height, downtilt and antenna gain in order to model the system. The final step is to determine a frequency reuse plan for the available carrier frequencies and apply the reuse plan to the modeling tool in order to maximize reuse while maintaining an acceptable C/I ratio. All of these modeling steps are purely theoretical and only provide an estimation or model of how the network will operate. Once the frequency reuse plan has been determined and tested using the modeling tool, it is assigned to the system by programming the network controller 10 to implement the reuse plan among its connected base stations 12. In the case of the iDEN system, database entries for each base station 12 are used to instruct the base station what frequencies it may transmit on. These database tables are programmed according to the desired frequency reuse plan and are downloaded from the network controller 10 to the local base stations 12 for implementation. Once the frequency reuse plan has been programmed into the system, in-field testing and measurements can be taken to verify the correctness of the propagation model.

The base station 10 of FIG. 1 generates two cells, an outer cell 14, and an inner cell 16 that is completely within the outer cell 14. Not shown in this figure are the plurality of other base stations 12 that form the remainder of the system. These additional base stations 12 create similar, adjacent cell patterns, thus forming a cellular grid. The outer cell 14 is that area covered by the outer cell alone and the inner sub-cell 16 is that area covered by both the inner and outer cells.

The carrier frequencies within the outer cells 14 are programmed into the network controller 10 according to a first frequency reuse pattern determined from the acceptable Carrier-to-Interference (C/I) and Received Signal Strength (RSSI) of the entire cellular system, i.e. taking into account only the existence of the outer grid of cells. But, carrier frequencies within the inner cells 16 are programmed into the network controller 10 according to a second frequency reuse pattern having a cluster size (or K-value) less than the pattern assigned to the outer cells, based on the acceptable C/I of the inner grid of cells. The inner cells 16 are shown as smaller than the outer cells 14 because the tighter reuse pattern of the inner cells results in a higher level of interference between adjacent inner cells than adjacent outer cells, thus resulting in a more limited area for the inner cell in which the mobile unit can operate before a threshold interference level is exceeded and the call quality degrades.

Within an inner sub-cell 16, a mobile unit can use either the carrier frequencies assigned to the inner cell, or those associated with the outer cell. Outside of the inner cells 16, the mobile unit can only use those carrier frequencies assigned to the outer cells 14. Although FIG. 1 shows the inner and outer cells being generated by a common base station 12, alternatively, there could be multiple base station transceivers at the same location (but at different heights), thus generating an underlay/overlay structure in place of that described in the figure. In another embodiment, an additional base station 12 is employed to generate the sub-cells, and this base stations is not co-located with the outer cell base station, but rather is located somewhere else within the outer cell, thus generating a microcell. This microcell could be placed at a point of high communication traffic in order to off-load outer cell traffic to an inner cell with a higher frequency reuse pattern, and thus a higher carrier frequency efficiency.

Figure 2:
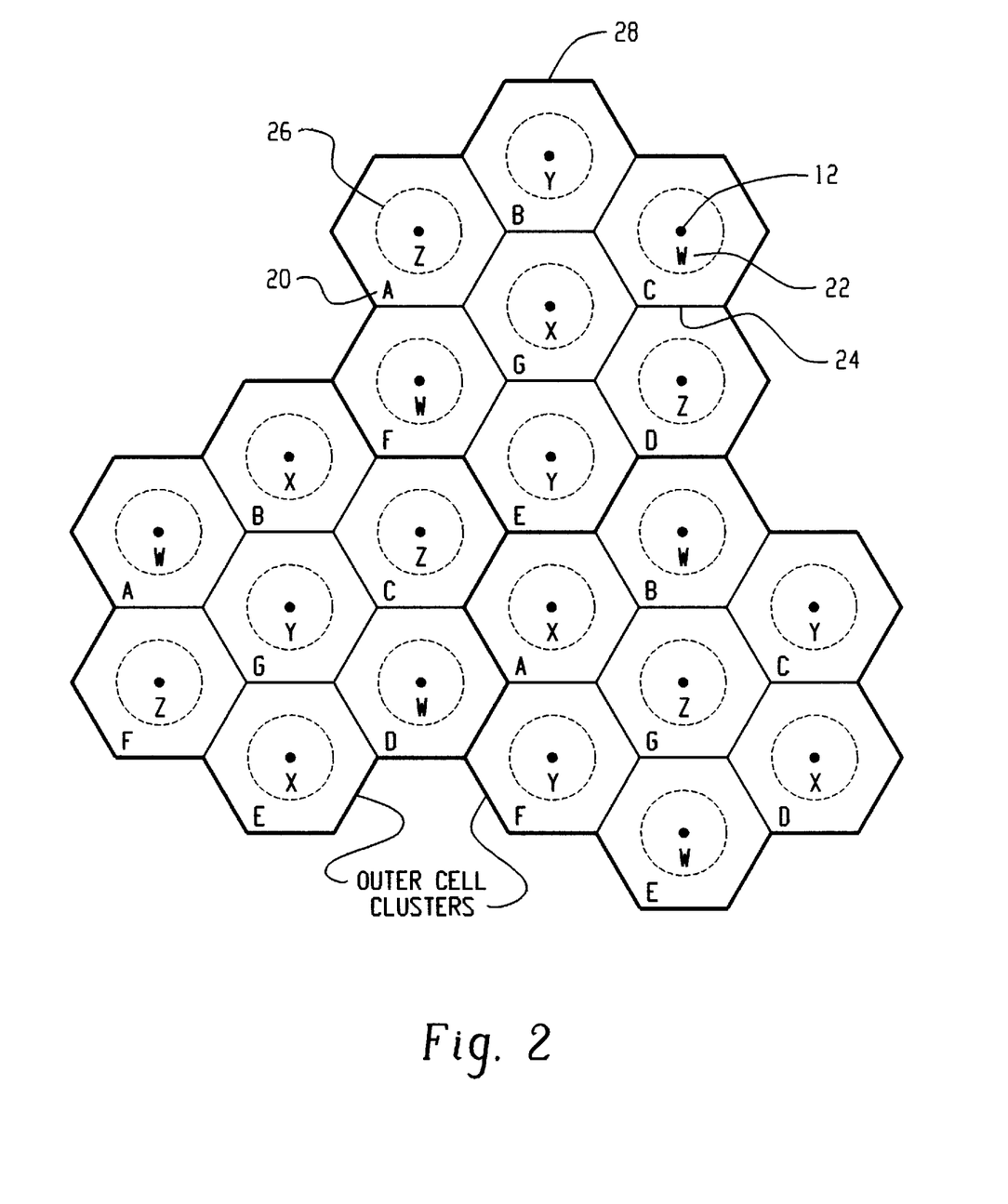
FIG. 2 is a diagram of a cellular grid generated by a preferred system according to the present invention having a pattern of outer cells, wherein each of the outer cells has at least one sub-cell, and wherein the outer cells are allocated frequencies according to a first frequency reuse pattern and the sub-cells are allocated frequencies according to a second frequency reuse pattern.

Turning now to FIG. 2, an exemplary cellular system generated using the method of the present invention is shown, having a plurality of base station transceivers located at the center of each cell (for ease of description, each cell is represented as an ideal hexagonal shape, although in reality the shape of each cell would be different and nonuniform.) Not shown are the network controller 10, which is connected to the base station transceivers 12, and the plurality of mobile units (subscribers) that communicate with the cellular system.

FIG. 2 shows 21 outer cells, each having a single inner cell. The 21 outer cells are clustered into groups of 7, the outer cell clusters. Carrier frequencies in the outer cells are thus deployed based on a cluster size of 7, i.e. a K-value of 7. These carrier frequencies are labelled A–G, and as can be seen from the drawing, only one of the 7 frequencies is assigned to each outer cell in the 7 cell cluster. These outer cells have a frequency reuse pattern with a K-value of 7.

The inner cells, which in this preferred embodiment are generated by the same base stations 12 as the outer cells, are assigned carrier frequencies by the network controller 10 on a tighter reuse pattern than the outer cells. In this example, the inner cells have a frequency reuse pattern with a K-value of 4. Frequencies X–Z are assigned to the inner cell frequency reuse groups 22. The outer cells are signal strength and interference limited by outer cell boundary 24, while the inner cells are interference limited at inner cell boundary 26. These boundaries are established by programming the system, i.e. the network controller, to perform a handoff when certain threshold levels for both RSSI and C/I reported by the mobile units. Because the method of the present invention provides mobile units that have the ability to directly measure the C/I level of a serving cell and neighboring cells, an overlapping grid of inner cells that purposely interfere with each other can be implemented in an existing cellular system, and the inner cells can be assigned frequencies with a much tighter frequency reuse pattern than the traditional outer cell-only implementation.

The concept of purposely generating interfering sub-cells is an important advantage of the present invention over the prior art systems. In the prior systems interference was avoided as much as possible and was generally seen as a negative byproduct of reusing carrier frequencies. As such, prior frequency planning and reuse optimization schemes emphasized minimizing co-channel interference between adjacent cells. (See, for example, W. C. Y. Lee, Mobile Cellular Communications, 2nd Edition, Chapters 2, 6 (1995)). By distinction, the present invention purposely generates adjacent sub-cells with a high level of co-channel interference and uses this interference level as a boundary or threshold for triggering a MAHO using a mobile unit capable of making direct C/I measurements. So, in the present invention interference is not avoided or minimized, but instead is used as a mechanism for increasing spectral efficiency of the cellular network.

According to FIG. 2, a mobile unit in the upper most cell 28 can communicate using carrier frequencies B and Y when the mobile is in the inner cell, and only carrier frequency B while in the outer cell. The size of the inner cells will depend on the cluster size or K-value chosen. A larger frequency reuse pattern for the inner cells will increase the size of the inner cells since carriers associated with the inner cells may be used at greater distances from the base station 12 before the C/I exceeds the programmed threshold level. By distinction, a smaller or tighter cluster size will result in a smaller inner cell pattern due to the higher level of interference from the more closely situated neighboring inner cell using the same frequency. The threshold level that determines the acceptable C/I level of the call could be altered, and this would result in a corresponding change in the size of the sub-cell. But, assuming a constant threshold, the tighter the frequency reuse pattern, the smaller the inner cells.

Although not shown explicitly in FIG. 2, the preferred embodiment of the present invention employs multiple overlapping sub-cells that may be centered at the base station for the outer cell, or which may be microcells positioned at other locations within the outer cell. For example, the efficiency gains of the present method as shown in FIG. 2 could be improved upon by adding a third "inner—inner" level of sub-cells within the inner cells, this third grid of cells having an even tighter frequency reuse pattern than the inner sub-grid, such as a K-value of 1. With a K-value of 1, every outer cell contains a sub-cell, the inner—inner cell, that is using the same carrier frequency. This level of frequency reuse is not possible in prior art systems, but is feasible according to the method of the present invention by providing interference defined sub-cells with multiple frequency reuse patterns and mobile units capable of performing fast interference measurements as the mobiles travel about the system.

Figure 3:
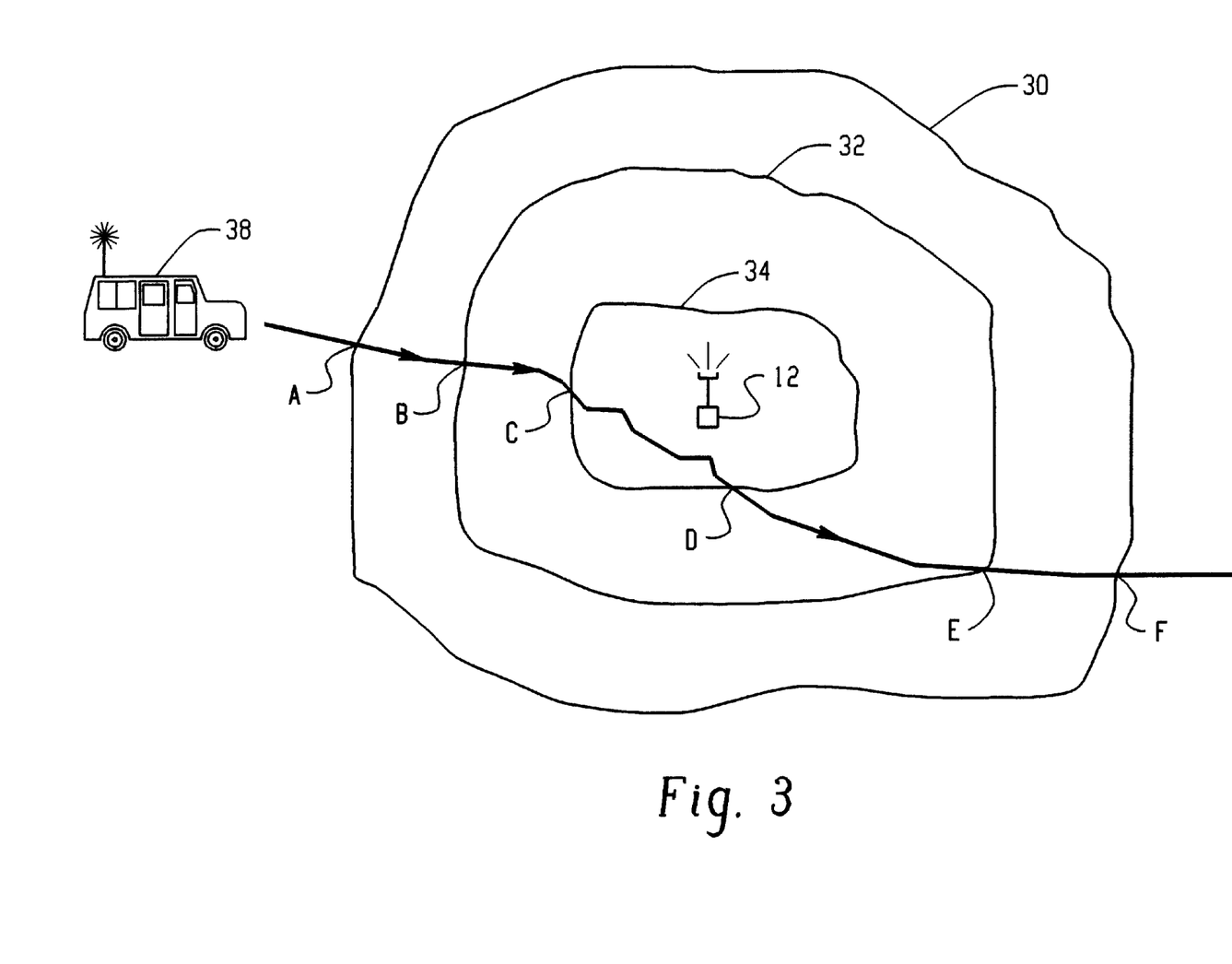
FIG. 3 is diagram of a single outer cell that forms part of preferred system shown in FIG. 2, the outer cell having two levels of sub-cells, an inner cell and an inner—inner cell, and showing the path of a mobile unit as it traverses the span of the outer cell, passing though both of the sub-cells.

FIG. 3 sets forth a map of part of a system created using the method of the present invention, showing a mobile unit 38 traversing an outer cell 30 having two levels of interference limited sub-cells 32, 34 generated by the same base station 12 that is generating the outer cell 30. Assuming the call is generated in another outer cell (not shown) adjacent to outer cell 30, mobile unit 38 would already have downloaded the neighbor list from the base station serving the adjacent cell. This neighbor list would include the outer cell 30, which the mobile unit 38 is travelling towards.

The mobile unit 38 has the ability to store a list of potential cell sites (the neighbor list) to which it might connect, the list including the serving cell site and at least one neighbor site. In addition, mobile unit 38 is able to perform real-time direct measurements of the RSSI and C/I from its serving cell and each of the neighbors. (The mobile unit 38 takes these measurements by monitoring a broadcast control channel associated with each base station on its presently stored neighbor list.) The mobile unit can then report these measurements to a serving base station when a threshold parameter has been exceeded, thereby requesting the network controller to switch the mobile unit 38 to a neighboring cell site.

When the mobile unit 38 reaches point A it will request a handoff to the outer cell 30. Presumably this occurred because the measurements from the serving cell (not shown) fell below the threshold levels programmed into the system, thus triggering a measurement report to the network controller. The neighbor list for the outer cell 30 is downloaded to the mobile unit 38 as the outer cell 30 now becomes the serving cell. This neighbor list includes the neighboring outer cells adjoining outer cell 30, and the inner cell 34. Mobile unit 38 continues on the call, taking measurements of RSSI and C/I (preferably the SQE parameter) of the serving cell 30 and the inner cell 34. At point B, the mobile unit 38 detects that the C/I for the inner cell 34 has exceeded the threshold acceptable interference level for switching to an inner cell programmed into the system and requests a handoff to the inner cell 34. Since the inner cells 34, 32 have a tighter frequency reuse pattern than the outer cells 30, it is always preferable to attempt to shift the call to the inner cells, assuming a carrier is available.

If a channel is available on the inner cell 34, the network controller instructs the mobile unit 38 to handover to that channel. If no channel is available, the network controller may ignore the measurement report, although the mobile unit 38 may continue to issue these handoff requests until either a handover to the inner cell 34 is performed, or until the measured C/I of the inner cell 34 falls below the acceptable threshold level programmed into the system. Alternatively, if no channel is available to switch over to, the mobile will not continue to generate additional measurement reports but when a channel becomes available the network controller 10 will switch the previously reporting mobile.

Assuming a proper handoff to the inner cell 34 occurs at B, the neighbor list for the inner cell 34 is then downloaded to the mobile unit 38. This neighbor list includes the outer cell 30 and the inner—inner cell 32. At point C the mobile unit detects that the C/I for the inner—inner cell 32 has exceeded the acceptable threshold level for handing off into the inner—inner cell and a measurement report requesting the handoff is transmitted to the network controller. In a similar fashion to point B, if no channel is available in the inner—inner cell, the mobile unit 38 continues to transmit measurement reports until the handoff to the inner—inner cell 32 occurs, or the C/I has dropped below acceptable levels. Assuming a proper handoff at point C to the inner—inner cell 32, the neighbor list of this cell will be downloaded to the mobile unit 38. This neighbor list includes the outer cell 30 and the inner cell 34.

When the mobile unit reaches point D, and assuming it has handed off to the inner—inner cell 32 at point C, the mobile unit detects that the C/I for its serving cell (the inner—inner cell 32) has fallen below the acceptable threshold interference level and the mobile will request a handoff. The preferred threshold level for entering a cell is greater than that for leaving a cell. This hysteresis in the threshold in/out levels prevents a mobile unit from continuously requesting handoff when it is travelling along a cell boundary. Preferably, the mobile unit 38 will request a handover to at least two other cells, ordered such that the first cell is the preferred choice, and the second cell is the alternative choice to switch to if there are no available channels on the first cell. So, at point D, the mobile unit 38 requests a handover to the inner and outer cells 34, 30, with the outer cell being used if the inner cell is fully loaded.

When the mobile unit reaches point E, it detects that the C/I of the serving cell, i.e. the inner cell 34, has fallen below the acceptable threshold level and requests a handover back to the outer cell 30. The neighbor list for the outer cell is then downloaded to the mobile unit 38. Finally, when the mobile unit 38 reaches point F it detects that the C/I for the serving cell 30 is not acceptable and requests a handoff to another outer cell from the outer cell 30 neighbor list.

This final handover at point F from outer cell 30 to a neighboring outer cell is based on both C/I and RSSI measurements made by the mobile. For the transitions to and from the inner cells only the C/I measurement is needed since RSSI is always high near the base station transceiver. But, for transitions from one outer cell to another, both RSSI and C/I measurements may be used in order to prevent handoff to a cell having acceptable C/I but low RSSI, such as a distant cell placed at a higher altitude.

FIG. 3 shows one example of how the present method can be used to create multiple-overlapping frequency reuse patterns based on interference-limited sub-cells within a grid of outer cells. The example of FIG. 3 does not require additional hardware to be added to the existing cellular infrastructure, and therefore can provide substantial spectral efficiency gains at minimal cost. Alternatively, the method of the present invention could be used with other configurations, such as underlay/overlay systems having multiple co-located base stations, or microcellular systems having non-co-located base stations within the outer cell.

Figure 4:
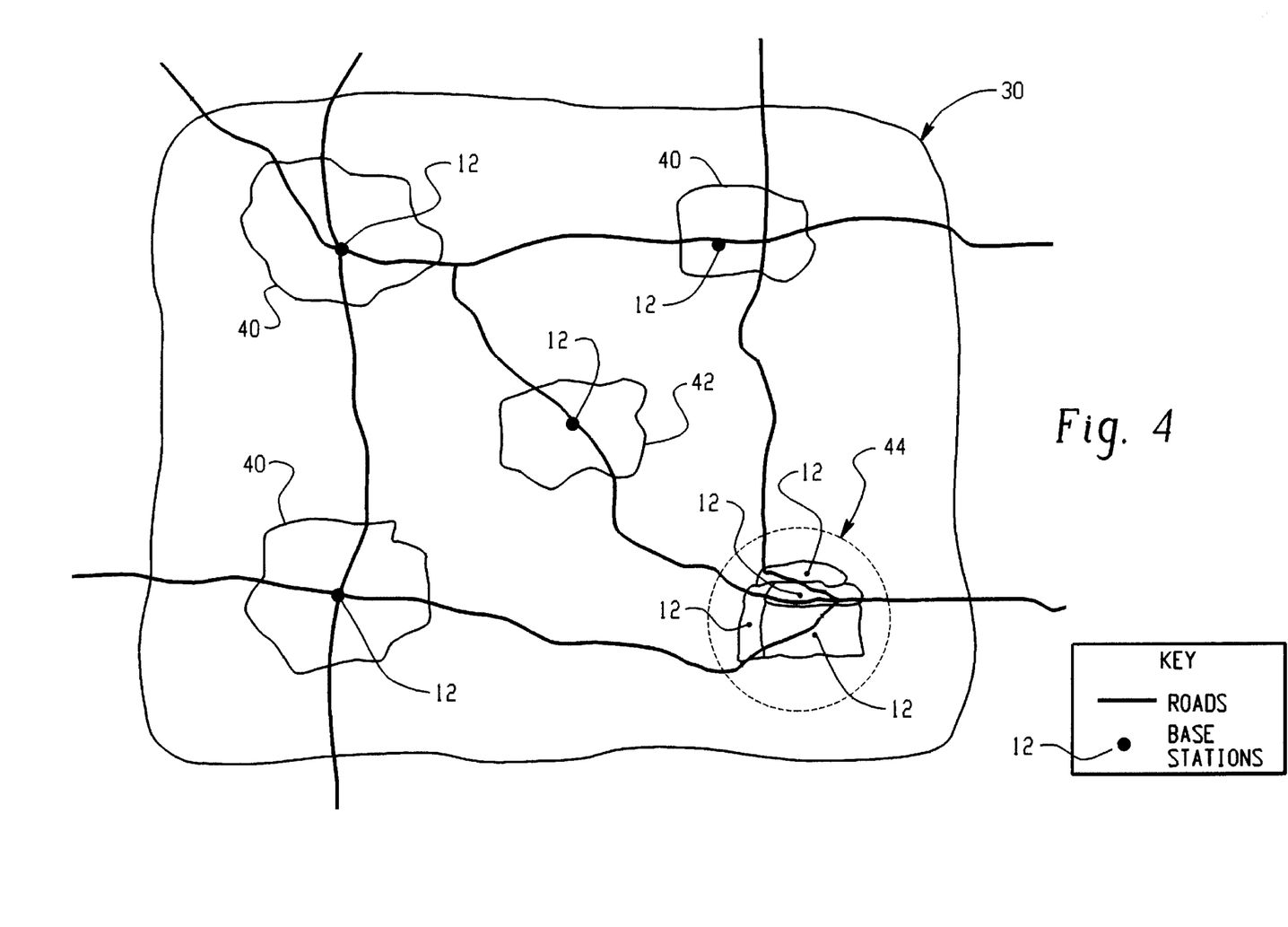
FIG. 4 is a diagram of alternative systems according to the present invention showing microcells that are generated by additional base station equipment and microclusters.

FIG. 4 sets forth alternative embodiments of the present invention where the interference-limited sub-cells are not necessarily generated by the base station equipment that generates the outer cell, but instead are generated by additional equipment. Within outer cell 30 three types of interference-limited inner cells or sub-cells are shown. Inner cells 40 are microcells generated using base stations 12 that are not co-located with the base station 12 that is generating the outer cell (this is the base station 12 at the center of the plot). Inner cell 42 is similar to inner cell 34 of FIG. 3. This interference-limited subcell is generated using the same base station antenna and transceiver as the outer cell 30. Finally, inner cells 44 represent a microcellular cluster of base stations 12, each generating a small sub-cell, having a very tight frequency reuse pattern, perhaps even a K-value of 1, in order to generate localized zones of high spectral efficiency for off-loading high traffic areas from the outer cell 30. These microcells cover only a small area since there is high co-channel interference from adjacent microcells that limit the switching boundary of the cell to a localized area very close to the transceiver.

Having described in detail the preferred embodiment of the present invention, including its preferred modes of operation, it is to be understood that this operation could be carried out with different elements and steps. This preferred embodiment is presented only by way of example and is not meant to limit the scope of the present invention which is defined by the following claims.

What is claimed:

1. A method of maximizing spectral efficiency in a cellular communications system having a grid of outer cells, a plurality of base stations that generate the grid of outer cells, and at least one network controller connected to the base stations for controlling the system, the method comprising the steps of:

assigning a first frequency reuse pattern to the grid of outer cells, the first frequency reuse pattern having a first K-value;

generating at least one sub-grid of inner cells within the grid of outer cells, the inner cells being interference-limited by adjacent inner cells within nearby outer cells;

assigning a second frequency reuse pattern to the sub-grid of inner cells, the second frequency reuse pattern having a second K-value that is less than the first K-value;

generating at least one sub-grid of inner—inner cells within the sub-grid of inner cells, the inner—inner cells being interference-limited by adjacent inner—inner cells within nearby inner cells;

assigning a third frequency reuse pattern to the sub-grid of inner—inner cells, the third frequency reuse pattern having a third K-value that is less than the first and second K-values; and providing a plurality of mobile units having the ability to directly measure the interference level of a serving cell that the mobile is communicating with and at least one neighboring cell.

2. The method according to claim 1, further comprising the steps of:

the plurality of mobile units:
downloading a neighbor list containing a plurality of nearby outer cells and inner cells from the serving base station that the mobile is communicating with;
periodically taking measurements of the signal strength and interference level of the serving cell and at least one neighbor on the neighbor list; and
transmitting a measurement report from the mobile unit to the network controller via the serving base station.

3. The method according to claim 2, further comprising the step of:

the network controller determining, based on the transmitted measurement report, whether to switch the mobile unit to a neighboring cell.

4. The method according to claim 1, wherein the outer cells and the inner cells are generated by the same base stations.

5. The method according to claim 1, wherein the inner cells are generated by separate base stations than the outer cells.

6. The method according to claim 1, wherein the base stations include omnidirectional antennas for transmitting a uniform radiation pattern from the base station.

7. The method according to claim 1, wherein the base stations include sectorized antennas for transmitting non-uniform radiation patterns from the base station.

8. The method according to claim 1, wherein the grid of inner cells are microcells.

9. The method according to claim 8, wherein the microcells are placed in a geographic location of high communication traffic.

10. The method according to claim 1, wherein the grid of inner cells includes at least one cluster of microcells in at least one of the outer cells.

11. The method according to claim 1, wherein the mobile units take direct measurements of received signal strength and interference of the serving cell and at least one neighboring cell, and reports these measurements to the network controller.

12. The method according to claim 11, wherein the network controller determines whether to switch the mobile unit to the neighboring cell based on the measurement report.

13. The method according to claim 12, wherein the network controller uses only the (C/I) measurement in determining whether to switch the mobile unit from an inner cell to an outer cell.

14. The method according to claim 12, wherein the network controller uses both the C/I and signal strength measurement in determining whether to switch the mobile unit from a serving outer cell to another, adjacent outer cell in the grid.

15. The method according to claim 1, wherein the second K-value is selected so as to create a high degree of interference between adjacent inner cells that can be directly measured by the mobile units in order to perform a mobile-assisted handoff.

16. A method of maximizing spectral efficiency in a cellular communications system having a grid of outer cells, a plurality of base stations that generate the grid of outer cells, and at least one network controller connected to the base stations for controlling the system, the method comprising the steps of:

assigning a first frequency reuse pattern to the grid of outer cells, the first frequency reuse pattern having a first K-value;

generating at least one sub-grid of inner cells within the grid of outer cells, the inner cells being interference-limited by adjacent inner cells within nearby outer cells;

assigning a second frequency reuse pattern of the sub-grid of inner cells, the second frequency reuse pattern having a second K-value that is less than the first K-value; and providing a plurality of mobile units having the ability to directly measure the interference level of a serving cell that the mobile is communicating with and at least one neighboring cell;

providing a first threshold carrier/interference (C/I) level for switching a mobile unit from an outer cell to an inner cell;

the mobile unit reporting (C/I) measurements of a serving outer cell and an included inner cell to the network controller; and the network controller switching the mobile unit to the inner cell of the measured (C/I) level is greater than the first threshold (C/I) level provided.

17. The method according to claim 16, further comprising the steps of:

providing a second threshold (C/I) level for switching a mobile unit from an inner cell to an outer cell;

the mobile unit reporting (C/I) measurements of a serving inner cell and outer cell in which the inner cell is located to the network controller; and the network controller switching the mobile unit to the outer cell if the measured (C/I) level is lower than the second threshold (C/I) level provided.

18. The method according to claim 15, wherein the second threshold (C/I) level is greater than the first threshold (C/I) level in order to prevent the network controller from continuously attempting to switch the mobile unit from an inner to an outer cell.

* * * * *